(12) United States Patent
Yoshida et al.

(10) Patent No.: US 10,232,252 B2
(45) Date of Patent: Mar. 19, 2019

(54) INFORMATION PROCESSING SYSTEM, INFORMATION PROCESSING METHOD, PROGRAM, AND INFORMATION STORAGE MEDIUM

(75) Inventors: Kazushi Yoshida, Tokyo (JP); Osamu Ota, Tokyo (JP); Hisashi Tomita, Tokyo (JP); Tatsuya Suzuki, Tokyo (JP); Ryota Akao, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 517 days.

(21) Appl. No.: 14/357,029

(22) PCT Filed: Aug. 8, 2012

(86) PCT No.: PCT/JP2012/070201
§ 371 (c)(1),
(2), (4) Date: May 8, 2014

(87) PCT Pub. No.: WO2013/077034
PCT Pub. Date: May 30, 2013

(65) Prior Publication Data
US 2014/0309039 A1    Oct. 16, 2014

(30) Foreign Application Priority Data
Nov. 21, 2011  (JP) ................................ 2011-253529
Nov. 21, 2011  (JP) ................................ 2011-253530

(51) Int. Cl.
*A63F 13/358*    (2014.01)
*A63F 13/30*     (2014.01)
(Continued)

(52) U.S. Cl.
CPC .............. *A63F 13/12* (2013.01); *A63F 13/35* (2014.09); *G06F 9/5027* (2013.01);
(Continued)

(58) Field of Classification Search
CPC ..................................................... G06F 15/173
See application file for complete search history.

(56) References Cited

U.S. PATENT DOCUMENTS

| | | | |
|---|---|---|---|
| 7,992,152 B2 | 8/2011 | Hashimoto | |
| 2007/0118630 A1* | 5/2007 | Hashimoto | ............... G06F 9/50 709/223 |
| 2007/0294387 A1* | 12/2007 | Martin | .................... H04L 29/06 709/224 |

FOREIGN PATENT DOCUMENTS

| | | |
|---|---|---|
| JP | 2010-176641 A | 8/2010 |
| WO | 2005062176 A1 | 7/2005 |

OTHER PUBLICATIONS

International Search Report for corresponding PCT Application PCT/JP2012/070201, dated Nov. 6, 2012.
(Continued)

*Primary Examiner* — Tramar Harper
*Assistant Examiner* — Jeffrey Wong
(74) *Attorney, Agent, or Firm* — Matthew B. Dernier, Esq.

(57) ABSTRACT

A front end server receives a request to start executing a game on at least one game server, the at least one game server being capable of executing at least one game, having an upper limit set to a total of amounts of resources that can be secured in executing at least one game, and executing a game as an object of execution when an amount of resources associated with the game as the object of execution can be secured. A management server starts a new game server when an amount of resources associated with the game according to the execution start request exceeds an amount of remaining resources that can be secured in each game server already started or being started at a time of receiving (Continued)

the execution start request. The management server makes one of the game servers execute the game according to the execution start request.

6 Claims, 6 Drawing Sheets

(51) Int. Cl.
    *G06F 9/50*     (2006.01)
    *A63F 13/35*     (2014.01)

(52) U.S. Cl.
    CPC ...... *G06F 9/5061* (2013.01); *A63F 2300/535* (2013.01); *G06F 2209/504* (2013.01); *Y02B 60/142* (2013.01); *Y02D 10/22* (2018.01)

(56) References Cited

OTHER PUBLICATIONS

International Preliminary Report on Patentability and Written Opinion for corresponding PCT Application PCT/JP2012/070201, dated Jun. 5, 2014.

\* cited by examiner

INFORMATION PROCESSING SYSTEM, INFORMATION PROCESSING METHOD, PROGRAM, AND INFORMATION STORAGE MEDIUM

TECHNICAL FIELD

The present invention relates to an information processing system, an information processing method, a program, and an information storage medium.

BACKGROUND ART

There is a technology that increases or decreases the number of servers providing service such as electronic commerce or the like according to service providing conditions such for example as a CPU usage rate, a network input-output frequency, a disk input-output frequency, and the like.

SUMMARY

Technical Problem

For example, when a game is to be provided as a service by a server, an amount of resources used per service is considered to be increased as compared with a service such as electronic commerce or the like. Hence, the ratio of an increase or a decrease in the number of servers to an increase or a decrease in the number of games executed is considered to be increased as compared with the ratio of an increase or a decrease in the number of servers to an increase or a decrease in the number of accesses in a service such as electronic commerce or the like. In addition, an amount of resources associated with a game to be executed (for example a maximum resource usage amount, an average resource amount, or the like predicted to be used in the game) is considered to be different according to the game to be executed. In addition, the number of games executable by one server is considered to be small as compared with the number of accesses that can be handled by one server in a service such as electronic commerce or the like. Therefore, an amount of resources associated with a game predicted to be executed (for example a maximum resource amount, an average resource amount, or the like predicted to be used in the game) is considered to greatly affect the determination of the number of servers to be operated. In addition, when a game is to be provided as a service by a server, a real-time performance higher than in a service such as electronic commerce or the like is desired.

Therefore, when the conventional technology that increases or decreases the number of servers providing service is applied to a situation in which a game is provided as a service by a server, even if an amount of resources associated with games whose execution is requested to be started can be provided by servers being started at a time of a flood of game execution start requests, for example, servers are started one after another without consideration given to the fact that the amount of resources associated with the games whose execution is requested to be started can be provided by the servers being started. As a result, not only necessary servers but also extra servers may be started.

In addition, the conventional technology does not control an increase or a decrease in the number of game servers for executing a game in consideration of a difference in an amount of resources associated with the game predicted to be executed.

The present invention has been made in view of the above problems. It is an object of the present invention to prevent extra servers from being started even when there is a flood of requests to start executing games provided as service by servers.

It is another object of the present invention to reflect information on a game predicted to be executed in an increase or a decrease in the number of game servers executing games.

Solution to Problem

In order to solve the above problems, according to the present invention, there is provided an information processing system including: receiving means for receiving an execution start request to start executing a game on at least one game server, the at least one game server each being capable of executing at least one game, having an upper limit set to a total of amounts of resources that can be secured in executing at least one game, and executing a game as an object of execution when an amount of resources associated with the game as the object of execution can be secured; starting means for starting a new game server when an amount of resources associated with the game according to the execution start request exceeds an amount of remaining resources that can be secured in each game server already started or being started at a time of receiving the execution start request; and executing means for making one of the game servers execute the game according to the execution start request.

In addition, according to the present invention, there is provided another information processing system including: at least one game server each being capable of executing at least one game, having an upper limit set to a total of amounts of resources that can be secured in executing at least one game, and executing a game as an object of execution when an amount of resources associated with the game as the object of execution can be secured; receiving means for receiving an execution start request to start executing a game on the at least one game server; starting means for starting a new game server when an amount of resources associated with the game according to the execution start request exceeds an amount of remaining resources that can be secured in a game server already started or being started at a time of receiving the execution start request; and executing means for making one of the game servers execute the game according to the execution start request.

In addition, according to the present invention, there is provided an information processing method including: a receiving step of receiving an execution start request to start executing a game on at least one game server, the at least one game server each being capable of executing at least one game, having an upper limit set to a total of amounts of resources that can be secured in executing at least one game, and executing a game as an object of execution when an amount of resources associated with the game as the object of execution can be secured; a starting step of starting a new game server when an amount of resources associated with the game according to the execution start request exceeds an amount of remaining resources that can be secured in a game server already started or being started at a time of receiving the execution start request; and an executing step of making one of the game servers execute the game according to the execution start request.

In addition, according to the present invention, there is provided a program for making a computer function as: receiving means for receiving an execution start request to start executing a game on at least one game server, the at least one game server each being capable of executing at least one game, having an upper limit set to a total of amounts of resources that can be secured in executing at least one game, and executing a game as an object of execution when an amount of resources associated with the game as the object of execution can be secured; starting means for starting a new game server when an amount of resources associated with the game according to the execution start request exceeds an amount of remaining resources that can be secured in a game server already started or being started at a time of receiving the execution start request; and executing means for making one of the game servers execute the game according to the execution start request.

In addition, according to the present invention, there is provided a computer readable information storage medium storing a program, the program making a computer function as: receiving means for receiving an execution start request to start executing a game on at least one game server, the at least one game server each being capable of executing at least one game, having an upper limit set to a total of amounts of resources that can be secured in executing at least one game, and executing a game as an object of execution when an amount of resources associated with the game as the object of execution can be secured; starting means for starting a new game server when an amount of resources associated with the game according to the execution start request exceeds an amount of remaining resources that can be secured in a game server already started or being started at a time of receiving the execution start request; and executing means for making one of the game servers execute the game according to the execution start request.

According to the present invention, a new game server is started when the amount of resources associated with the game according to the execution start request exceeds the amount of remaining resources that can be secured in the game server already started or being started. It is thus possible to prevent extra servers from being started even when there is a flood of requests to start executing games provided as service by servers.

In a mode of the present invention, when, of already started game servers, there is a game server in which the amount of resources associated with the game according to the execution start request is within a range of an amount of remaining resources that can be secured at the time of receiving the execution start request, the executing means makes the game server execute the game according to the execution start request.

In addition, in a mode of the present invention, when, of already started game servers, there is no game server in which the amount of resources associated with the game according to the execution start request is within a range of an amount of remaining resources that can be secured, but there is a game server being started in which the amount of resources associated with the game according to the execution start request is within a range of an amount of remaining resources that can be secured, at the time of receiving the execution start request, the executing means makes the game server being started execute the game according to the execution start request. Besides, when, of already started game servers, there is no game server in which the amount of resources associated with the game according to the execution start request is within a range of an amount of remaining resources that can be secured, and there is no game server being started in which the amount of resources associated with the game according to the execution start request is within a range of an amount of remaining resources that can be secured, at the time of receiving the execution start request, the starting means starts a new game server, and the executing means makes the game server started by the starting means execute the game according to the execution start request.

In addition, according to the present invention, there is provided yet another information processing system including: game identifying means for identifying at least one game predicted to be executed on a basis of information associated with a user using the game provided by at least one game server each capable of executing at least one game; and game server control means for performing control to start a new game server or performing control to stop an operating game server according to an amount of resources associated with the identified game.

In addition, according to the present invention, there is provided yet another information processing system including: at least one game server each capable of executing at least one game; game identifying means for identifying at least one game predicted to be executed on a basis of information associated with a user using the game provided by the at least one game server; and game server control means for performing control to start a new game server or performing control to stop an operating game server according to an amount of resources associated with the identified game.

In addition, according to the present invention, there is provided another information processing method including: a game identifying step of identifying at least one game predicted to be executed on a basis of information associated with a user using the game provided by at least one game server each capable of executing at least one game; and a game server control step of performing control to start a new game server or performing control to stop an operating game server according to an amount of resources associated with the identified game.

In addition, according to the present invention, there is provided another program for making a computer function as: game identifying means for identifying at least one game predicted to be executed on a basis of information associated with a user using the game provided by at least one game server each capable of executing at least one game; and game server control means for performing control to start a new game server or performing control to stop an operating game server according to an amount of resources associated with the identified game.

In addition, according to the present invention, there is provided another computer readable information storage medium storing a program, the program making a computer function as: game identifying means for identifying at least one game predicted to be executed on a basis of information associated with a user using the game provided by at least one game server each capable of executing at least one game; and game server control means for performing control to start a new game server or performing control to stop an operating game server according to an amount of resources associated with the identified game.

According to the present invention, control to start a new game server or control to stop an operating game server is performed according to the amount of resources associated with the identified game. Thus, information on the game predicted to be executed is reflected in an increase or a decrease in the number of game servers executing games.

In a mode of the present invention, the game identifying means identifies the game associated with information provided from an information providing server to the user before the game is executed by the game server.

In addition, in a mode of the present invention, the game identifying means identifies the game on a basis of a history of execution of the game on the game server by the user accessing the game server.

In addition, in a mode of the present invention, the game identifying means identifies the game on a basis of a number of times of play performed by the user using the game executed by the game server.

In addition, in a mode of the present invention, the information processing system further includes game server number identifying means for identifying a number of game servers to be operated on the basis of the amount of resources associated with the game identified by the game identifying means, wherein the game server control means performs control to start a new game server or performs control to stop an operating game server so that the identified number of game servers are operated.

In addition, in a mode of the present invention, the game identification by the game identifying means and the control by the game server control means are performed periodically.

DESCRIPTION OF EMBODIMENTS

An embodiment of the present invention will hereinafter be described in detail with reference to the drawings.

Figure 1:
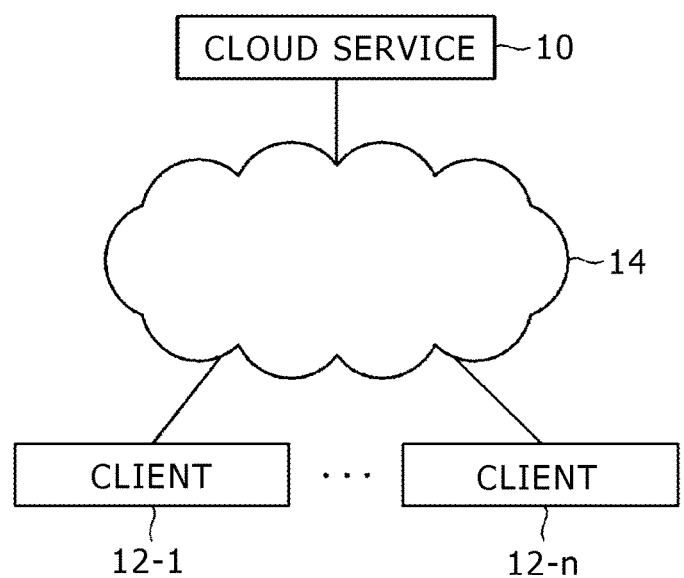
FIG. 1 is a diagram showing an example of a general configuration of a computer network according to an embodiment of the present invention.

FIG. 1 is a diagram showing an example of a general configuration of a computer network according to an embodiment of the present invention. As shown in FIG. 1, the computer network 14 such as the Internet or the like is connected with a cloud service 10 and a client 12 (12-1 to 12-n), each of which is configured centering on a computer. The cloud service 10 and the client 12 can communicate with each other.

The client 12 is a computer used by a user of the cloud service 10. The client 12 is for example a personal computer, a game console, a television receiver, a portable type game device, a portable information terminal, or the like. The client 12 includes for example a control section such as a CPU or the like, a storage section such as storage elements including a ROM and a RAM, a hard disk drive, and the like, an output section such as a display, a speaker, and the like, an input section such as a game controller, a touch pad, a mouse, a keyboard, a microphone, and the like, and a communicating section such as a network board and the like.

In addition, the client 12 according to the present embodiment has a web browser installed thereon in advance, and executes the web browser.

The cloud service 10 is for example a distributed computing environment. The cloud service 10 includes a plurality of web application servers, a plurality of database servers, a plurality of storage devices, and the like that are connected so as to be able to communicate with each other. The servers included in the cloud service 10 for example include a control section such as a CPU or the like, a storage section such as storage elements including a ROM and a RAM, a hard disk drive, and the like, and a communicating section as a communication interface such as a network board and the like. These elements are connected to each other via a bus.

The client 12 using the cloud service 10 can use various kinds of service provided by the cloud service 10 without being particularly aware of the locations of resources such as the servers, the storage devices, and the like present within the cloud service 10.

In the present embodiment, when the client 12 accesses the cloud service 10 through the web browser, inputs a user ID and a password, and then accesses a predetermined URL, a screen corresponding to the predetermined URL is displayed on the display of the client 12. Incidentally, after the user ID and the password are input, the cloud service 10 can identify the user ID of the user using the client 12 by referring to a session ID, for example.

In the present embodiment, for example, when the user using the client 12 logs in to the cloud service 10, the cloud service 10 transmits, to the client 12, a listing page showing a game providing schedule (for example game titles, provision start times, provision end times, and the like) for each of genres (for example battle games, puzzle games, and the like) of a plurality of games. The client 12 then outputs, for display, the listing page that has been received to the display or the like via the web browser. Then, when the user performs an operation of selecting a game from among games shown on the listing page, the client 12 transmits a request to transmit a detailed page showing detailed information on the selected game to the cloud service 10. The cloud service 10 then transmits the detailed page of the selected game to the client 12. The client 12 then outputs, for display, the detailed page that has been received to the display or the like via the web browser.

When the game shown on the detailed page is a game being provided by the cloud service 10, the user can perform an operation of starting executing the game shown on the detailed page (for example an operation of clicking on an execution button included in the detailed page or the like). When the user then performs the operation of starting executing the game shown on the detailed page, the client 12 transmits a request to start executing the game to the cloud service 10. When the cloud service 10 then receives the request to start executing the game, the cloud service 10 starts executing the game. Then, while the game is executed, the cloud service 10 transmits a stream of an encoded moving image provided with audio, which moving image represents the play contents of the game, to the client 12. The client 12 then receives and decodes the moving image provided with audio. The client 12 generates a game screen on which a frame image of the decoded moving image is disposed and outputs the game screen to the display of the client 12 or the like for display, and outputs the received audio from the speaker of the client 12.

In the present embodiment, each user can enjoy a game by for example depressing buttons of the game controller while viewing the moving image transmitted from the cloud service 10. In the present embodiment, each user can perform operations of moving a player object in the game and the like by performing key input such for example as depressing buttons of the game controller.

In addition, the storage sections of the storage devices or the like included in the cloud service 10 store, in advance, an image file (disk image) of an information storage medium such as a CD-ROM or the like. This image file includes for example a game program, image data, audio data, and the like.

Figure 2:
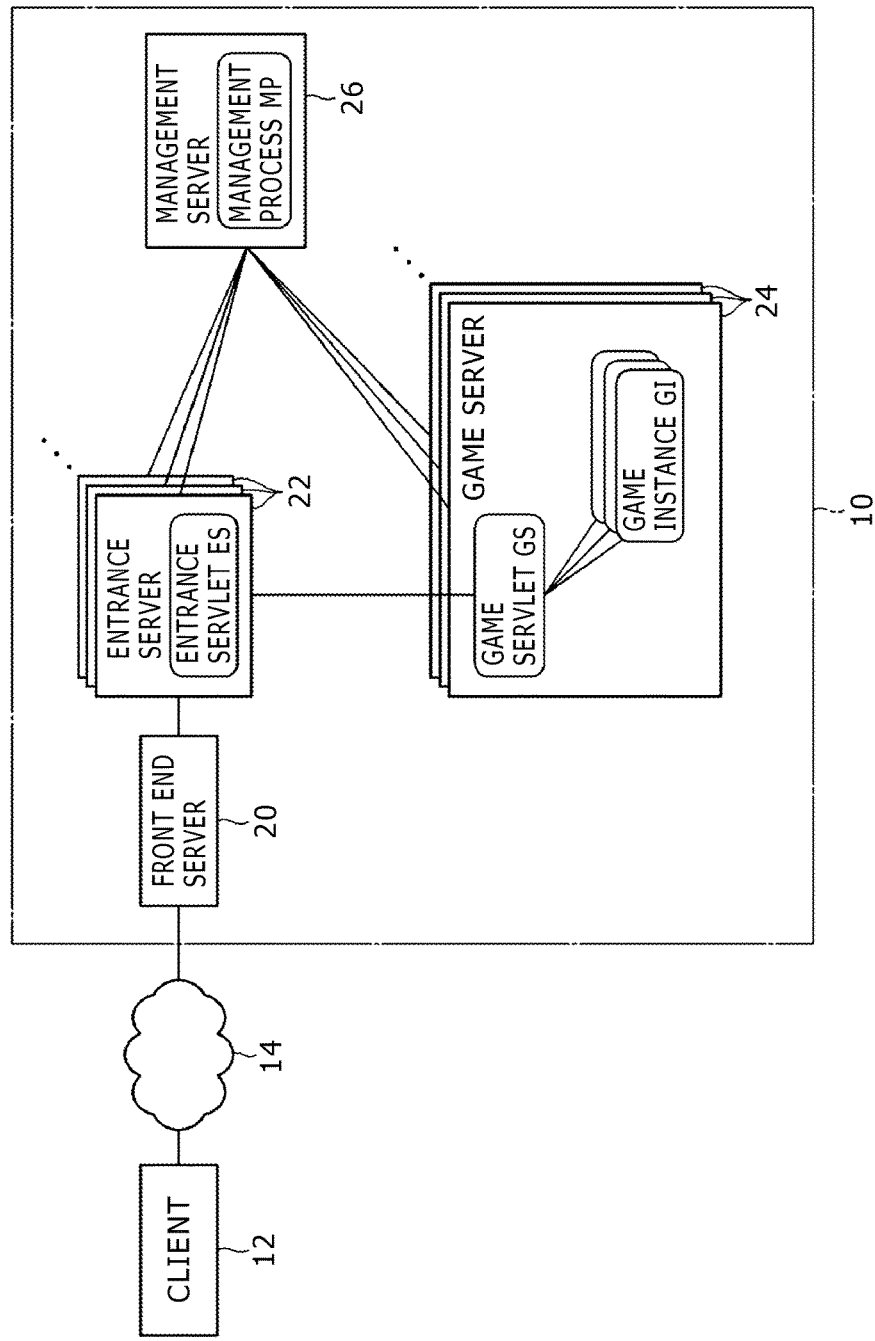
FIG. 2 is a diagram showing an example of a virtual server configuration in a cloud service according to an embodiment of the present invention.

FIG. 2 is a diagram showing an example of a virtual server configuration in the cloud service 10 according to the present embodiment. As shown in FIG. 2, the cloud service 10 according to the present embodiment virtually includes a front end server 20, an entrance server 22, a game server 24, and a management server 26. It is to be noted that the functions of each of the servers shown in FIG. 2 may be physically implemented in any manner. For example, a plurality of kinds of server functions shown in FIG. 2 may be implemented by one server, or one kind of server function shown in FIG. 2 may be implemented by a plurality of servers.

The servers included in the cloud service 10 such as the front end server 20, the entrance server 22, the game server 24, the management server 26, and the like are configured centering on a computer, as described above, and each functional element performed by each server is implemented by executing a program. In addition, the program is for example supplied to the servers included in the cloud service 10 such as the front end server 20, the entrance server 22, the game server 24, the management server 26, and the like via a computer readable information storage medium such as a CD-ROM, a DVD-ROM, or the like or a communication network such as the Internet or the like.

The front end server 20 is for example a web server that receives a request from the client 12 and transmits a response to the client 12. The front end server 20 also plays a role as a receiving section for receiving a request to start executing a game from the client 12. The entrance server 22 is for example a server that executes an application server process or the like in which an entrance servlet ES for performing processing according to an HTTP request received by the front end server 20 or the like is disposed. The game server 24 is for example a server that executes an application server process in which a game servlet GS as a servlet for receiving a processing request from the entrance server 22 or the like is disposed, a game instance GI as a process for executing a game provided to the client 12, and the like. The management server 26 is a server that for example monitors a load on the server group and manages the starting and stopping of the game server 24.

In the present embodiment, the front end server 20 or the entrance servlet ES of the entrance server 22 generates the listing page and the detailed page described above. In addition to these pages, the front end server 20 or the entrance server 22 also generates a play history list page displaying a list of play histories of a predetermined number of games recently played by the user, a popular game ranking page displaying a list of the titles of a predetermined number of games played highest numbers of times within a latest predetermined period, and the like. These pages are also provided to the client 12 according to a request from the client 12. The front end server 20 or the entrance server 22 in the present embodiment thus plays a role as an information providing server for providing information associated with a game before the game is executed by the game server 24. In addition, when the client 12 accessed the various kinds of pages described above, the cloud service 10 according to the present embodiment outputs access logs including the user ID of the user who made the access, access times, the identifying information of the accessed pages, and the like to the storage section of the cloud service 10. In addition, when the user played a game, the game server 24 for example outputs play history information including the user ID of the user who played the game, the identifying information of the played game (ID, title, or the like of the game), a play start time, a play end time, and the like to the storage section of the cloud service 10.

Then, according to a request from the user, the front end server 20 or the entrance server 22 generates a listing page customized for the user on the basis of the access logs, play history information and the like of the user (for example a listing page on which information on a game group judged to interest the user on the basis of the access logs, play history information and the like of the user (for example information on a game group belonging to a genre in which games are played large numbers of times) is disposed). The front end server 20 or the entrance server 22 transmits the listing page to the client 12.

In addition, the cloud service 10 according to the present embodiment can additionally start a virtual server in a server unit, and stop an operating virtual server in a server unit.

The management server 26 is executing a management process MP as a process generated by starting a management program installed on a server or a storage device included in the cloud service 10. Then, the management process MP performs processing of managing the location of the game instance GI, processing of starting the game instance GI and processing of stopping the game instance GI, processing of starting the game server 24 and processing of stopping the game server 24, processing of connecting the client 12 and the game instance GI to each other according to a request from the client 12 and processing of disconnecting the client 12 and the game instance GI from each other according to a request from the client 12, the monitoring of the load on the server group, and the like.

In the present embodiment, the game instance GI is a virtual machine (emulator) for executing a game program stored in the game server 24. The game instance GI is generated when the management process MP starts an emulator program installed on a server or a storage device included in the cloud service 10 according to a request from the client 12.

Then, according to a request to start executing a game from the client 12, the game servlet GS executed by the game server 24 reads the image file of the game program specified by the client 12, and loads the image file into the game instance GI. This makes the game program executed by the game instance GI. Incidentally, the game instance GI may load the game program specified by the client 12 into the game instance GI itself.

In addition, for example, according to a request from the client 12 or the management process MP, the game instance GI outputs a memory image and a register (for example a program counter or the like) emulated and managed by the game instance GI, a log of input-output access by the game program operating on the game instance GI, a log of CPU instructions and GPU instructions executed on the game instance GI, and the like.

In the present embodiment, one client 12 can monopolize one game instance GI. In addition, a plurality of clients 12 can be connected to one game instance GI. In addition, a plurality of game programs can be executed on one game instance GI. In addition, in the present embodiment, one client 12 can also be connected to a plurality of game instances GI.

In addition, in the present embodiment, the servers included in the cloud service 10 are each assigned unique identifying information (for example a server name, an IP address, or the like). Therefore, a server included in the cloud service 10 can identify the other servers.

In addition, in the present embodiment, each time a game is executed by the game server 24, the management server 26 measures an index indicating a maximum resource usage amount when the game is executed, and outputs maximum resource usage amount data indicating a result of the measurement to the storage section of the cloud service 10 in association with the identifying information of the executed game. In the present embodiment, concrete examples of the maximum resource usage amount include an index indicating an amount of usage of a CPU in the virtual server when the CPU is used most (more specifically, for example, a maximum CPU usage amount, a maximum CPU usage rate, a maximum CPU usage time, and the like), an index indicating an amount of usage of memory in the virtual server when the memory is used most (more specifically, for example, a maximum memory usage amount and the like), an index indicating an amount of input-output performed in the virtual server when the input-output is performed most (more specifically, for example, a maximum number of times of network input-output per unit time (maximum network input-output frequency) and a maximum number and frequency of times of disk input-output per unit time (maximum network input-output frequency)), and the like. Then, concrete examples of the maximum resource usage amount data include maximum CPU usage amount data indicating the maximum CPU usage amount, maximum CPU usage rate data indicating the maximum CPU usage rate, maximum CPU usage time data indicating the maximum CPU usage time, maximum memory usage amount data indicating the maximum memory usage amount, maximum network input-output frequency data indicating the maximum network input-output frequency, maximum disk input-output frequency data indicating the maximum disk input-output frequency, and the like. Then, in the present embodiment, when the value of the maximum resource usage amount data indicating the measurement result exceeds the value of stored maximum resource usage amount data, the management server 26 updates the stored maximum resource usage amount data. Thus, in the present embodiment, when the game is executed a plurality of times, the maximum resource usage amount data in a game execution in which the maximum resource usage amount is largest among the plurality of times of game execution is stored in the storage section of the cloud service 10. Then, in the cloud service 10 according to the present embodiment, when a request to start executing the game is received, the maximum resource usage amount data of the game can be obtained.

In addition, in the present embodiment, the storage section of the cloud service 10 stores upper limit resource amount data indicating an upper limit to a total of amounts of resources that can be secured in game execution in one game server 24 (for example upper limit CPU usage amount data indicating an upper limit to a CPU usage amount, upper limit CPU usage rate data indicating an upper limit (for example 100%) to a CPU usage rate, upper limit CPU usage time data indicating an upper limit to a CPU usage time, upper limit memory usage amount data indicating an upper limit to a memory usage amount, upper limit network input-output frequency data indicating an upper limit to a network input-output frequency, upper limit disk input-output frequency data indicating an upper limit to a disk input-output frequency, and the like). Incidentally, for example, variations in amount of resources used by an operating system or the like may vary the upper limit to the total of the amounts of resources that can be secured in game execution in one game server 24. Accordingly, the management server 26 may monitor the amount of resources used by the operating system or the like in the game server 24 (for example perform the monitoring at predetermined time intervals). Then, the management server 26 may calculate the upper limit to the total of the amounts of resources that can be secured in game execution on the basis of a result of the monitoring, and update the value of the upper limit resource amount data to the calculated value. Of course, the management server 26 may monitor the upper limit to the total of the amounts of resources that can be secured in game execution in one game server 24, and update the value of the upper limit resource amount data to a value that is a result of the monitoring. The value of the upper limit resource amount data may be thus variable.

In addition, in the present embodiment, the storage section of the cloud service 10 stores execution management data associated with each of operating (already started) game servers 24, the execution management data including the identifying information of the game server 24 and the identifying information of each of at least one game being executed in the game server 24. Then, the cloud service 10 can obtain information as to which games are being executed by the operating game servers 24 on the basis of the execution management data.

Figure 3:
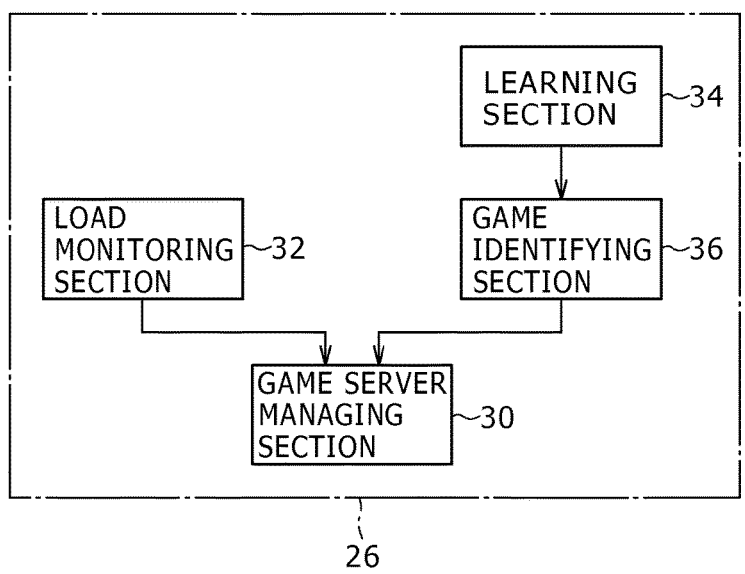
FIG. 3 is a functional block diagram showing an example of functions implemented by a management server according to an embodiment of the present invention.

FIG. 3 is a functional block diagram showing an example of functions implemented by the management server 26 according to the present embodiment. Incidentally, FIG. 3 merely shows functions particularly related to the following description. The management server 26 according to the present embodiment also implements functions other than the functions shown in FIG. 3.

As shown in FIG. 3, the management server 26 according to the present embodiment functionally includes for example a game server managing section 30, a load monitoring section 32, a learning section 34, and a game identifying section 36. These functions are implemented mainly by a control section provided to the management server 26, for example. As described above, the management server 26 is configured centering on a computer, as described above, and each functional element performed by each server is implemented by executing a program. In addition, the program is for example supplied to the management server 26 via a computer readable information storage medium such as a CD-ROM, a DVD-ROM, or the like or a communication network such as the Internet or the like.

The game server managing section 30 performs the identification of a game server 24 in which a game as an execution start object is to be executed, the starting and stopping of the game server 24, the connection and disconnection of the game instance GI and the client 12 to and from each other, and the like. The load monitoring section 32 performs the measurement of the above-described maximum resource usage amount, the output of the maximum resource usage amount data to the storage section, and the like. The learning section 34 performs learning processing serving as a basis for the prediction of the number of necessary game servers 24 in periodic scaling to be described later. The game identifying section 36 performs game identification serving as a basis for the prediction of the number of necessary game servers 24 in the periodic scaling to be described later.

Figure 4:
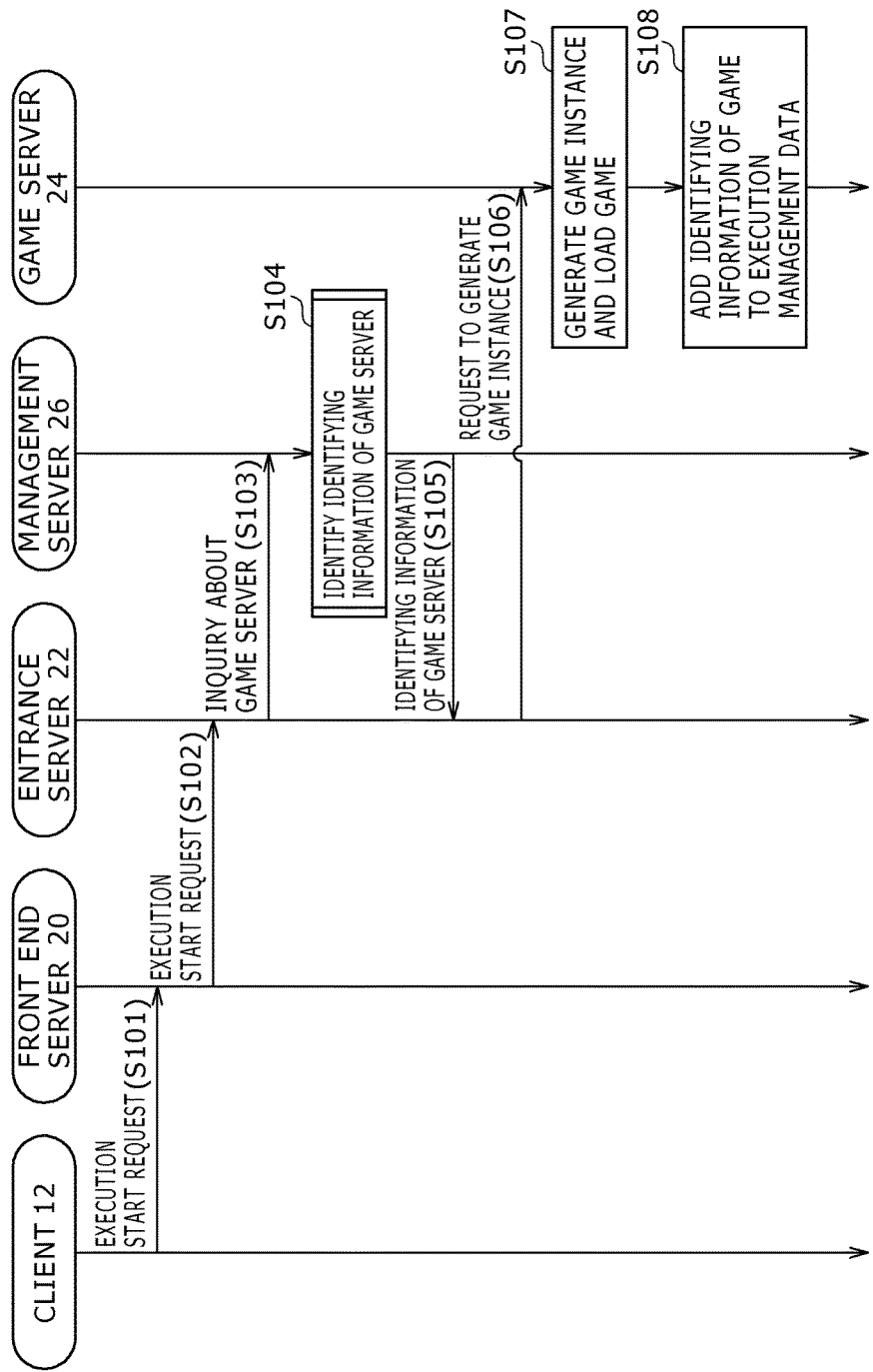
FIG. 4 is a flowchart of an example of a flow of processing performed in the cloud service according to an embodiment of the present invention.

In the following, referring to a flowchart of FIG. 4, description will be made of an example of a flow of processing from the reception of a game execution start request from the client 12 to the loading of the game program of a game as an execution start object into the game instance GI, which processing is performed in the cloud service 10 according to the present embodiment.

First, the front end server 20 receives a game execution start request from the client 12 (S101). This execution start request is associated with the identifying information of the game as the execution start object (which identifying information is for example the ID, title, or the like of the game). The front end server 20 then transmits the received execution start request to the entrance server 22 (S102). The entrance server 22 then outputs an inquiry about a game server 24 in which the game as the execution start object is to be executed to the management server 26. The game server managing section 30 of the management server 26 then receives the inquiry (S103).

The game server managing section 30 of the management server 26 then identifies the game server 24 in which the game as the execution start object is to be executed (S104). In the processing shown in S104, the game server managing section 30 of the management server 26 starts the game server 24 as required. The start corresponds to ad hoc scaling to be described later. Details of the processing shown in S104 will be described later.

The game server managing section 30 of the management server 26 then outputs the identifying information of the identified game server 24 to the entrance server 22 (S105). The entrance server 22 then outputs a request to generate the game instance GI, which request is associated with the identifying information of the game as the execution start object, to the game server 24 identified on the basis of the identifying information received from the management server 26 in the processing shown in S105 (S106). In this step, when the game server 24 identified on the basis of the identifying information received from the management server 26 in the processing shown in S105 is being started, the entrance server 22 outputs the request to generate the game instance GI after the starting of the game server 24 is completed.

Then, receiving the generating request, the game server 24 generates the game instance GI, and loads the game program of the game as the execution start object into the generated game instance GI (S107). The game server 24 that has received the generating request in the processing shown in S106 then adds the identifying information of the game corresponding to the loaded game program to the execution management data including the identifying information of the game server 24 (S108). The processing shown in the present processing example is then ended.

After the game is loaded into the game instance GI as described above, the game server managing section 30 of the management server 26 connects the client 12 from which the game execution start request is output and the generated game instance GI to each other. Then, an encoded moving image provided with audio, which moving image represents the play contents of the game executed in the game instance GI, is transmitted to the client 12.

Then, when the client 12 transmits a request to end the game being executed to the cloud service 10, the game server 24 in which the game instance GI of the game requested to be ended is being executed ends the game instance GI. This makes the game instance GI disappear from the game server 24, so that the resources used by the game instance GI are freed. In addition, the game server 24 deletes the identifying information of the game executed in the game instance GI from the execution management data including the identifying information of the game server 24.

In addition, as described above, the cloud service 10 according to the present embodiment optimizes the number of operating game servers 24. In the present embodiment, the number of operating game servers 24 is optimized by two kinds of scaling methods: (1) ad hoc scaling that additionally starts a game server 24 to meet a request from the client 12 in a case where game execution start requests received from clients 12 increase suddenly, for example; and (2) periodic scaling that predicts the number of necessary game servers 24, and starts or stops game servers 24 so as to achieve the predicted number, at predetermined time intervals. Then, as described above, the ad hoc scaling is performed as required in the processing shown in S104 described above.

Figure 5:
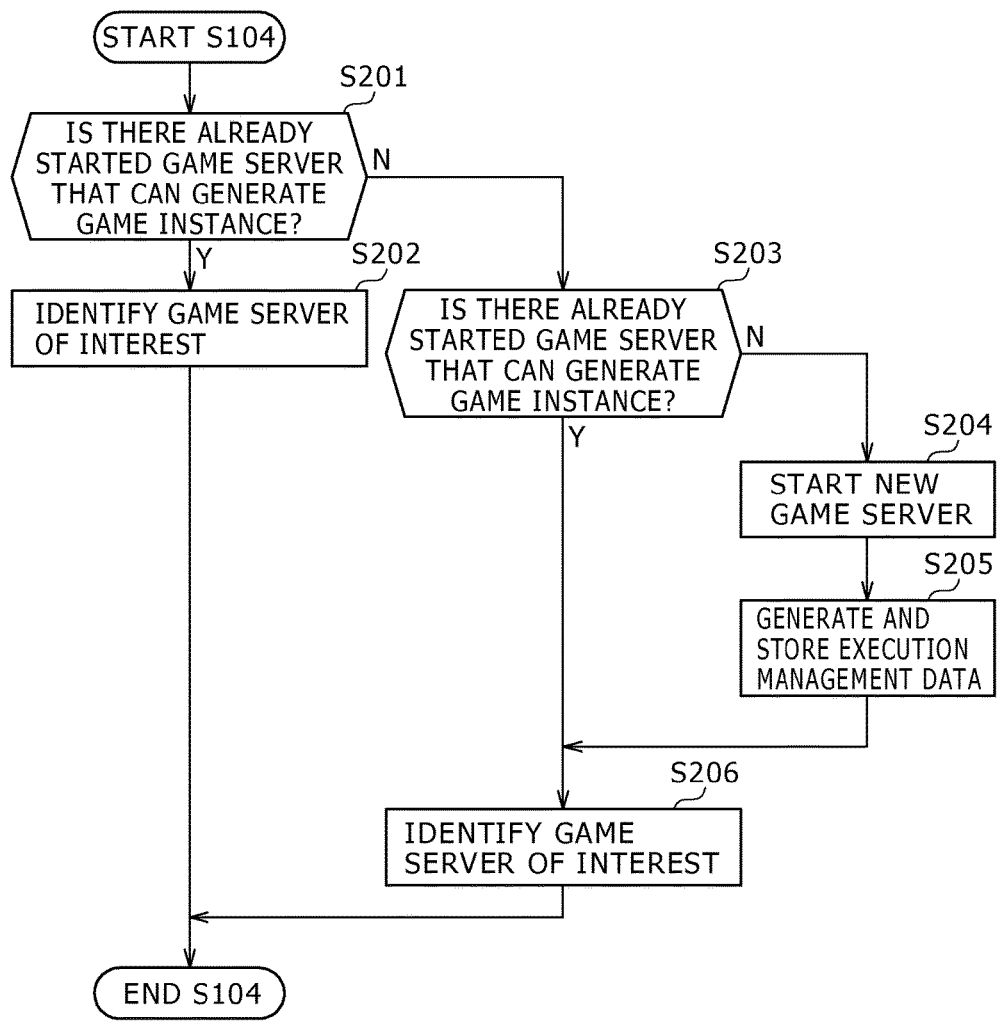
FIG. 5 is a flowchart of an example of a flow of processing performed in the cloud service according to an embodiment of the present invention.

Details of the processing shown in S104 will be described in the following with reference to a flowchart of FIG. 5. First, the game server managing section 30 of the management server 26 determines whether or not there are already started (operating) game servers 24 that can generate a game instance GI for the game as the execution start object (in this case already started game servers 24 in which an amount of resources associated with the game as the execution start object is within the range of an amount of remaining resources that can be secured) (S201). The processing shown in S201 for example determines whether or not there is an already started game server 24 in which a value obtained by subtracting the value of maximum resource usage amount data (for example a total of values of maximum CPU usage rate data) of each game associated with the game server 24 in the execution management data from the value of upper limit resource amount data (for example the value of upper limit CPU usage rate data) of the game server 24 is equal to or more than the value of a maximum resource usage amount (for example the value of maximum CPU usage rate data) of the game as the execution start object.

When there are such already started game servers 24 (S201: Y), the game server managing section 30 of the management server 26 identifies, as a game server of interest, a game server 24 that can minimize the amount of remaining resources that can be secured after generating the game instance GI of the game as the execution start object (S202). The processing shown in S104 is then ended. In the processing shown in S202, the game server managing section 30 of the management server 26 for example identifies, as a game server of interest, a game server 24 in which the total of maximum CPU usage rates of games being executed is largest from among the game servers 24 whose presence is confirmed in the processing shown in S201 (which game servers 24 will hereinafter be referred to as candidate game servers).

Figure 6:
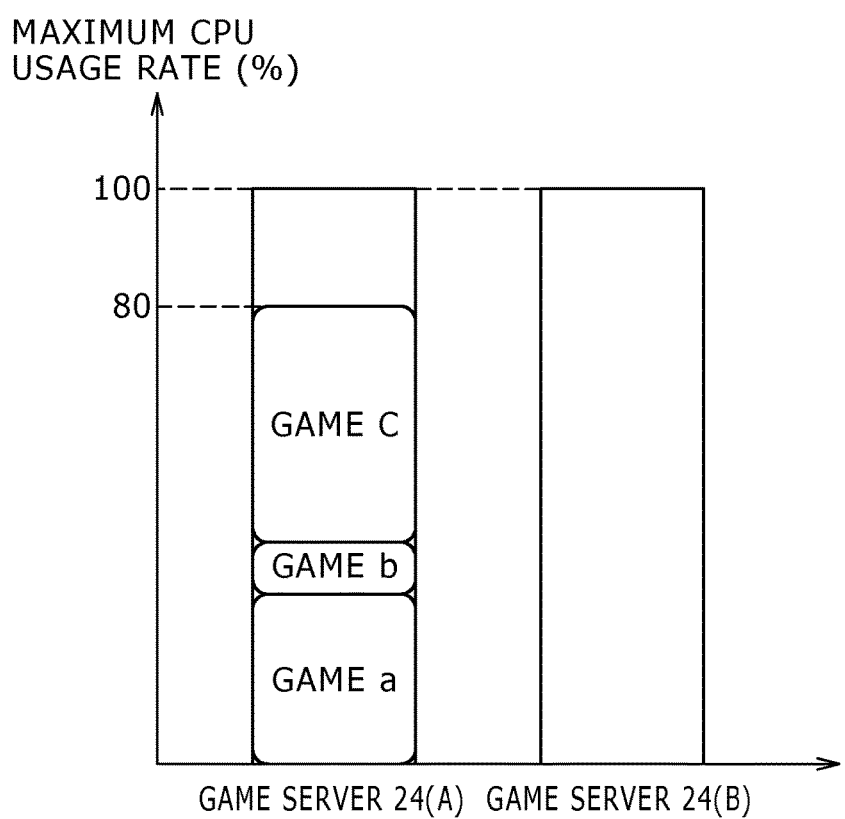
FIG. 6 is a diagram schematically showing an example of a total of maximum CPU usage rates of games executed on game servers.

FIG. 6 is a diagram schematically showing an example of the totals of maximum CPU usage rates of games executed in a game server 24(A) and a game server 24(B). As shown in FIG. 6, a situation is assumed in which the game server 24(A) and the game server 24(B) are operating, three games (game "a," game "b," and game "c") whose values of maximum CPU usage rate data total 80% are being executed in the game server 24(A), and there is no game being executed in the game server 24(B).

In this case, when the value of maximum CPU usage rate data of the game as the execution start object is 30%, 20% as a value obtained by subtracting the total of the maximum CPU usage rates of the games being executed in the game server 24 from the value of the upper limit CPU usage rate data (100% in this case) of the game server 24(A) is less than 30% as the value of the maximum CPU usage rate data of the game as the execution start object. Thus, the game server 24(A) is not identified as a candidate game server. On the other hand, the game server 24(B) is identified as a candidate game server. In this case, because only the game server 24(B) is identified as a candidate game server, the game server 24(B) is identified as the game server of interest.

When the value of maximum CPU usage rate data of the game as the execution start object is 15%, 20% as the value obtained by subtracting the total of the maximum CPU usage rates of the games being executed in the game server 24 from the value of the upper limit CPU usage rate data (100% in this case) of the game server 24(A) is 15% or more as the value of the maximum CPU usage rate data of the game as the execution start object. Thus, the game server 24(A) is identified as a candidate game server. The game server 24(B) is also identified as a candidate game server. Then, of the candidate game servers, a game server 24 in which the total of maximum CPU usage rates of games being executed is largest is the game server 24(A). Thus, the game server 24(A) is identified as the game server of interest.

When it is determined in the processing shown in S201 that there are no game servers 24 in which the maximum resource usage amount of the game as the execution start object is within the range of an amount of remaining resources that can be secured (S201: N), the game server managing section 30 of the management server 26 determines whether or not there is a game server 24 being started which game server can generate a game instance GI for the game as the execution start object (in this case a game server 24 being started in which the amount of resources associated with the game as the execution start object is within the range of an amount of remaining resources that can be secured) (S203). The processing shown in S203 determines whether or not there is a game server 24 in which the maximum resource usage amount of the game as the execution start object is within the range of an amount of remaining resources that can be secured even when the game instances GI of games whose execution is to be started when the game server 24 is started (games associated with the game server 24 being started in the execution management data) are generated. More specifically, for example, the processing shown in S203 determines whether or not there is a game server 24 being started in which a value obtained by subtracting the value of maximum resource usage amount data (for example a total of values of maximum CPU usage rate data) of each game associated with the game server 24 being started in the execution management data from the value of upper limit resource amount data (for example the value of upper limit CPU usage rate data) of the game server 24 being started is equal to or more than the value of the maximum resource usage amount (for example the value of maximum CPU usage rate data) of the game as the execution start object.

When there is no such game server 24 being started (S203: N), the game server managing section 30 of the management server 26 starts a new game server 24 (S204). The processing shown in S204 corresponds to the above-described ad hoc scaling. Then, the game server managing section 30 of the management server 26 generates execution management data including the identifying information of the game server 24, and makes the storage section of the cloud service 10 store the execution management data (S205).

The game server managing section 30 of the management server 26 then identifies the game server of interest (S206). The processing shown in S104 is then ended. In the processing shown in S206, when the presence of a game server 24 satisfying the above-described condition is confirmed in the processing shown in S203 (S203: Y), the game server 24 whose presence is confirmed is identified as the game server of interest, and when the processing shown in S204 is performed, the game server 24 newly started in the processing shown in S204 is identified as the game server of interest.

Then, in the above-described processing shown in S105, the game server managing section 30 of the management server 26 outputs the identifying information of the game server of interest identified in the processing shown in S202 or S206 to the entrance server 22. In the present embodiment, when a new game server is identified as the game server of interest, a game instance GI is generated in the game server of interest and the game program of the game as the execution start object is loaded into the game instance GI immediately after completion of the starting of the game server of interest by the processing shown in S204. Then, when the game server being started is identified as the game server of interest, a game instance GI is generated in the game server of interest and the game program of the game as the execution start object is loaded into the game instance GI immediately after completion of the starting of the game server of interest which game server is being started. Then, when an already started game server is identified as the game server of interest, a game instance GI is generated in the game server of interest and the game program of the game as the execution start object is loaded into the game instance GI without waiting for completion of the starting of the game server. A time from an end of the processing shown in S206 to a start of execution of the game program as the execution start object therefore becomes longer in order of the case where an already started game server is identified as the game server of interest, the case where a game server being started is identified as the game server of interest, and the case where the new game server started in the processing shown in S204 is identified as the game server of interest.

Thus, according to the present embodiment, even if there is a flood of game execution start requests, a new game server 24 is started for the first time when the resources of a game server 24 being started become insufficient. The starting of extra game servers 24 can be therefore prevented.

Periodic scaling will be described in the following.

In the present embodiment, the learning section 34 of the management server 26 generates learning data in predetermined timing (for example at predetermined time intervals), the learning data including prediction basis data that is the values of parameters or the like serving as a basis for the prediction of the number of necessary game servers 24 (which number will hereinafter be referred to as a necessary game server number) and learning game server number data indicating the number of game servers 24 operating a predetermined time after timing of obtainment of the values of the parameters or the like indicated by the prediction basis data. The learning section 34 of the management server 26 makes the storage section of the cloud service 10 store the learning data.

The learning section 34 for example identifies, as values of the prediction basis data, the identifying information of a game (which identifying information is for example the ID, title, or the like of the game) shown on a detailed page accessed within a latest predetermined time by a user who has logged in in learning timing and the number of times of access to the detailed page of the game. For example, 100 times of access made to the detailed page of game "a" and 200 times of access made to the detailed page of game "b" are identified. The learning section 34 then identifies the number of game servers 24 operating a predetermined time (for example two minutes) after the identification of the identifying information of the game as the value of learning game server number data. The learning section 34 then makes the storage section store the learning data including the identifying information of the identified game and the number of times of access as the prediction basis data and including the value of the number of operating game servers 24 as the value of the learning game server number data.

Then, after generating the above-described learning data, the learning section 34 generates relation data indicating a relation between the game and the necessary game server number on the basis of learning data generated by a plurality of times of learning performed thus far. In the present embodiment, for example, the value of the learning game server number data associated with one time of access to the detailed page of the game, which value is identified on the basis of the learning data, is identified as the necessary game server number for the game. In this case, for example, suppose that relation data including the identifying information of game "a" and a value of 0.1 as the necessary game server number and relation data including the identifying information of game "b" and a value of 0.2 as the necessary game server number are generated.

Then, in the present embodiment, periodic scaling is performed periodically (for example at predetermined time intervals). The game identifying section 36 of the management server 26 identifies users who have logged in in timing of performing the periodic scaling. The game identifying section 36 of the management server 26 then identifies the identifying information of a game shown on a detailed page accessed within the above-described latest predetermined time by each of the identified users as the identifying information of the game predicted to be performed, on the basis of access logs. Thus, at least one game and the number of times of access made to the detailed page of the game are identified. The game server managing section 30 of the management server 26 then identifies the necessary game server number on the basis of the identified game and the number of times of access made to the detailed page of the game as well as the above-described relation data. For example, when the number of times of access to game "a" is 100 and the number of times of access to game "b" is 150, the necessary game server number is identified as 40 (sum of a product of 100 and 0.1 and a product of 150 and 0.2).

When the thus identified necessary game server number is larger than the number of game servers 24 operating in the timing of the periodic scaling (which number will hereinafter be referred to as an operating game server number), the game server managing section 30 of the management server 26 performs control to start a number of new game servers 24 which number is obtained by subtracting the operating game server number from the necessary game server number.

When the identified necessary game server number is smaller than the operating game server number, on the other hand, the game server managing section 30 of the management server 26 performs control to stop up to a maximum number of game servers 24 executing no game instance GI which number is obtained by subtracting the necessary game server number from the operating game server number. Incidentally, here, the game server managing section 30 of the management server 26 may perform control to stop a game server 24 in timing in which a time up to timing of performing charging according to a time of usage of the game server 24 becomes equal to or less than a predetermined time (specifically, for example, an average play time of a game executed in the game server 24).

Thus, according to the present embodiment, information on a game predicted to be executed is reflected in an increase or a decrease in the number of game servers 24 executing games.

It is to be noted that processing related to the periodic scaling is not limited to the above-described examples.

For example, the identifying information of a game shown on a detailed page accessed last by a user who has logged in in learning timing may be used as prediction basis data in place of the identifying information of a game shown on a detailed page accessed within a latest predetermined time by a user who has logged in in learning timing. The game identifying section 36 of the management server 26 may then identify the identifying information of a game shown on a detailed page accessed last by each of users who have logged in in timing of performing the periodic scaling.

In addition, for example, the identifying information of a game shown on a listing page provided to a user who has logged in may be used as prediction basis data in place of the identifying information of a game shown on a detailed page. In addition, the learning section 34 may generate relation data indicating a necessary game server number associated with one time of provision of information on a game by the listing page. Alternatively, the learning section 34 may generate relation data indicating a relation between a ratio of battle games on the listing page and the number of players in a battle and the necessary game server number. The game identifying section 36 may then identify games shown on the listing pages of users who have logged in in the timing of the periodic scaling. The game server managing section 30 may then identify the necessary game server number on the basis of the identified games and the above-described relation data.

In addition, for example, the identifying information of a game played within a latest predetermined time by a user who has logged in, which identifying information is indicated in the play history information, may be used as prediction basis data. The learning section 34 may then generate relation data indicating the necessary game server number associated with one time of game play within the latest predetermined time. The game identifying section 36 may then identify the necessary game server number on the basis of the game played within the latest predetermined time by the user who has logged in in the timing of the periodic scaling and the above-described relation data.

In addition, the learning section 34 may generate relation data indicating a relation between at least one game (popular game) played with a high frequency by a user who has logged in and the necessary game server number. Then, the game identifying section 36 may identify the at least one game (popular game) played with a high frequency by the user who has logged in in the timing of the periodic scaling, and identify the necessary game server number on the basis of the identified game and the above-described relation data.

In addition, for example, the learning section 34 may generate relation data indicating a relation between a time up to a start time or an end time of an event related to a game provided by the cloud service 10 or a time from the start time or the end time of the event and the necessary game server number. The game server managing section 30 may then identify the necessary game server number on the basis of a relation between the timing of the periodic scaling and the start time or the end time of the event and the above-described relation data.

In addition, for example, for each of users, information on a friend user close to the user may be registered in the cloud service 10. The learning section 34 may then generate relation data indicating a relation between the necessary game server number and a game played in the timing of the periodic scaling by the friend user of the user who has logged in in learning timing, a game included in a message such as an invitation, a recommendation or the like from the friend user to the user who has logged in in learning timing, a game watched by the user who has logged in in learning timing, a game repeatedly played by the user who has logged in in learning timing, a game for which a paid ticket has been purchased by the user who has logged in in learning timing, or the like. The game identifying section 36 may then identify the necessary game server number on the basis of the above-described information related to the user who has logged in in the timing of the periodic scaling and the above-described relation data.

In addition, for example, the management server 26 may identify the necessary game server number by treating a game for which there are no tickets remaining after being purchased by the user who has logged in or a game in which a stage that the user has failed to clear many times and has continued is finally cleared as a game that will end soon.

In addition, the identifying information of a game genre may be used in place of the identifying information of a game in the prediction basis data and the relation data described above. The game identifying section 36 may then identify the game genre. The game server managing section 30 may then identify the necessary game server number on the basis of the identified game genre.

In addition, the learning section 34 may generate relation data indicating a relation between a combination of a plurality of elements illustrated as prediction basis data and relation data in the above description and the necessary game server number. The management server 26 may then identify the necessary game server number on the basis of the combination of the plurality of elements in the timing of the periodic scaling and the above-described relation data.

Incidentally, in the present embodiment, an entity providing the cloud service 10 may be different from or identical with an entity providing the end user using the client 12 with the service realized through an application program by operating the application program on the virtual server group provided by the cloud service 10.

It is to be noted that the present invention is not limited to the foregoing embodiment.

For example, each time the game server 24 executes a game, the management server 26 may output maximum resource usage amount data indicating a result of measurement of the maximum resource usage amount of the game to the storage section of the cloud service 10 in association with the identifying information of the genre of the executed game. Then, for example, the processing shown in S201 may determine whether or not there is a game server 24 in which a value obtained by subtracting the value of maximum resource usage amount data associated with the identifying information of the genre of each game associated with the game server 24 in the execution management data from the value of upper limit resource amount data of the game server 24 is equal to or more than the value of the maximum resource usage amount of the game as the execution start object. Thus, maximum resource usage amounts may be managed in game genre units instead of in game units.

In addition, for example, maximum resource usage amount data may indicate a representative value of maximum resource usage amounts in a latest predetermined number of times of game execution (for example an average value of the maximum resource usage amounts in the latest predetermined number of times of game execution).

In addition, for example, the cloud service 10 may use, in place of the maximum resource usage amount data, average resource usage amount data indicating a result of measurement of an average resource usage amount such as an average CPU usage rate, an average memory usage amount, an average number of times of network input-output (average network input-output frequency) per unit time, an average number and frequency of times of disk input-output (average network input-output frequency) per unit time, or the like in game execution. In this case, when a game is executed a plurality of times, average resource usage amount data in a game execution in which the average resource usage amount is largest among the plurality of times of game execution may be stored in the storage section of the cloud service 10. In addition, in this case, the average resource usage amount data may indicate a representative value of average resource usage amounts in a latest predetermined number of times of game execution (for example an average value of the average resource usage amounts in the latest predetermined number of times of game execution). Incidentally, in this case, the upper limit resource amount data may indicate an upper limit to a total of average resource usage amounts that can be secured in game execution.

In addition, for example, in the periodic scaling, the management server 26 may identify, as the necessary game server number, a number of game servers 24 necessary to generate a value of game instances GI which value is obtained by multiplying the number of game instances GI operating in the timing of the periodic scaling by a predetermined number (for example 1.1).

In addition, for example, the management server 26 may identify, as the necessary game server number, a number obtained by increasing the present number of operating game servers 24 by the number of game servers 24 started in a latest predetermined time (for example a time (two minutes, for example) required to start the game servers 24) or by decreasing the present number of operating game servers 24 by the number of game servers 24 stopped in the latest predetermined time.

In addition, the servers included in the cloud service 10 may provide services such as shopping sites, SNS (Social Networking Service), and the like.

In addition, the game program does not need to be executed on an emulator, but may be executed on system software (operating system or the like) of the cloud service 10 or the client 12, for example. In addition, division of roles between the cloud service 10 and the client 12 is not limited to the above-described examples.

In addition, the above concrete character strings and the concrete character strings in the drawings are illustrative, and are not limited to these character strings.

The invention claimed is:

1. An information processing system comprising:
   a receiving unit operating to receive a plurality of execution start requests, each of the plurality of execution start requests being a request to start executing a respective game application on at least one game server among a plurality of game servers, each of the plurality of game servers being capable of executing at least one game application, having an upper limit set to a total of amounts of resources that can be secured in executing at least one game application, and executing a game application as an object of execution when an amount of resources associated with the game application as the object of execution can be secured;

a starting unit operating to start a new game server among the plurality of game servers when an amount of resources associated with a respective game application that has been requested to execute according to a given one of the execution start requests, at a time of receiving the given one of the execution start requests, exceeds an amount of remaining resources that can be secured in:

(i) each game server already started among the plurality of game servers, and (ii) each game server being started among the plurality of game servers, wherein the new game server is defined as any game server among the plurality of game servers that is neither servicing any of the execution start requests nor is executing any of the respective game applications at the time of receiving the given one of the execution start requests, the game server already started is defined as any game server among the plurality of game servers that has already begun executing one or more of the respective game applications at the time of receiving the given one of the execution start requests, and the game server being started is defined as any game server among the plurality of game servers that has been called to service at least one of the execution start requests, but has not yet begun to execute any of the respective game applications associated with the at least one of the execution start requests at the time of receiving the given one of the execution start requests; and an executing unit operating to make the game servers execute the respective game applications according to the execution start requests.

2. The information processing system according to claim 1, wherein when, of the already started game servers, there is a game server in which the amount of resources associated with the game application according to the given one of the execution start requests is within a range of an amount of remaining resources that can be secured at the time of receiving the execution start request, the executing unit makes the game server execute the game application according to the given one of the execution start requests.

3. The information processing system according to claim 1, wherein when, of the already started game servers, there is no game server in which the amount of resources associated with the game application according to the given one of the execution start requests is within a range of an amount of remaining resources that can be secured, but there is a game server being started in which the amount of resources associated with the game application according to the given one of the execution start requests is within a range of an amount of remaining resources that can be secured, at the time of receiving the given one of the execution start requests, the executing unit makes the game server being started execute the game application according to the given one of the execution start requests, and when, of the already started game servers, there is no game server in which the amount of resources associated with the game application according to the given one of the execution start requests is within a range of an amount of remaining resources that can be secured, and there is no game server being started in which the amount of resources associated with the game application according to the given one of the execution start requests is within a range of an amount of remaining resources that can be secured, at the time of receiving the given one of the execution start requests, the starting unit starts a new game server, and the executing unit makes the game server started by the starting unit execute the game application according to the given one of the execution start requests.

4. An information processing system comprising:

a plurality of game servers, each being capable of executing at least one game, having an upper limit set to a total of amounts of resources that can be secured in executing at least one game, and executing a game application as an object of execution when an amount of resources associated with the game application as the object of execution can be secured;

a receiving unit operating to receive a plurality of execution start requests, each of the plurality of execution start requests being a request to start executing a respective game application on at least one game server among the plurality of game servers;

a starting unit operating to start a new game server among the plurality of game servers when an amount of resources associated with a respective game application that has been requested to execute according to a given one of the execution start requests, at a time of receiving the given one of the execution start requests, exceeds an amount of remaining resources that can be secured in:

(i) each game server already started among the plurality of game servers, and (ii) each game server being started among the plurality of game servers, wherein the new game server is defined as any game server among the plurality of game servers that is neither servicing any of the execution start requests nor is executing any of the respective game applications at the time of receiving the given one of the execution start requests, the game server already started is defined as any game server among the plurality of game servers that has already begun executing one or more of the respective game applications at the time of receiving the given one of the execution start requests, and the game server being started is defined as any game server among the plurality of game servers that has been called to service at least one of the execution start requests, but has not yet begun to execute any of the respective game applications associated with the at least one of the execution start requests at the time of receiving the given one of the execution start requests; and an executing unit operating to make the game servers execute the respective game applications according to the execution start requests.

5. An information processing method, comprising:

receiving a plurality of execution start requests, each of the plurality of execution start requests being a request to start executing a respective game application on at least one game server among a plurality of game servers, each of the plurality of game servers being capable of executing at least one game application, having an upper limit set to a total of amounts of resources that can be secured in executing at least one game application, and executing a game application as an object of execution when an amount of resources associated with the game application as the object of execution can be secured;

starting a new game server among the plurality of game servers when an amount of resources associated with a respective game application that has been requested to execute according to a given one of the execution start requests, at a time of receiving the given one of the execution start requests, exceeds an amount of remaining resources that can be secured in:

(i) each game server already started among the plurality of game servers, and (ii) each game server being started among the plurality of game servers, wherein the new game server is defined as any game server among the plurality of game servers that is neither servicing any of the execution start requests nor is executing any of the respective game applications at the time of receiving the given one of the execution start requests, the game server already started is defined as any game server among the plurality of game servers that has already begun executing one or more of the respective game applications at the time of receiving the given one of the execution start requests, and the game server being started is defined as any game server among the plurality of game servers that has been called to service at least one of the execution start requests, but has not yet begun to execute any of the respective game applications associated with the at least one of the execution start requests at the time of receiving the given one of the execution start requests; and making the game servers execute the respective game applications according to the execution start requests.

6. A non-transitory, computer readable information storage medium storing a program, which when executed by a computer, causes the computer to carry out actions, comprising:

receiving a plurality of execution start requests, each of the plurality of execution start requests being a request to start executing a respective game application on at least one game server among a plurality of game servers, each of the plurality of game servers being capable of executing at least one game application, having an upper limit set to a total of amounts of resources that can be secured in executing at least one game application, and executing a game application as an object of execution when an amount of resources associated with the game application as the object of execution can be secured;

starting a new game server among the plurality of game servers when an amount of resources associated with a respective game application that has been requested to execute according to a given one of the execution start requests, at a time of receiving the given one of the execution start requests, exceeds an amount of remaining resources that can be secured in:

(i) each game server already started among the plurality of game servers, and (ii) each game server being started among the plurality of game servers, wherein the new game server is defined as any game server among the plurality of game servers that is neither servicing any of the execution start requests nor is executing any of the respective game applications at the time of receiving the given one of the execution start requests, the game server already started is defined as any game server among the plurality of game servers that has already begun executing one or more of the respective game applications at the time of receiving the given one of the execution start requests, and the game server being started is defined as any game server among the plurality of game servers that has been called to service at least one of the execution start requests, but has not yet begun to execute any of the respective game applications associated with the at least one of the execution start requests at the time of receiving the given one of the execution start requests; and making the game servers execute the respective game applications according to the execution start requests.

* * * * *